(12) United States Patent
Breme et al.

(10) Patent No.: US 8,905,388 B2
(45) Date of Patent: Dec. 9, 2014

(54) BLOCK PIECE FOR HOLDING AN OPTICAL WORKPIECE, IN PARTICULAR A SPECTACLE LENS, FOR PROCESSING THEREOF, AND METHOD FOR MANUFACTURING SPECTACLE LENSES ACCORDING TO A PRESCRIPTION

(75) Inventors: Frank Breme, Hausen am Albis (CH); Laurent Jordi, Charmey (CH); Edward McPherson, Asslar (DE); Stefan Schäfer, Hüttenberg (DE); Marc Savoie, Wetzlar (DE)

(73) Assignee: Satisloh AG, Baar (CH)

( * ) Notice: Subject to any disclaimer, the term of this patent is extended or adjusted under 35 U.S.C. 154(b) by 1080 days.

(21) Appl. No.: 12/919,328

(22) PCT Filed: Feb. 24, 2009

(86) PCT No.: PCT/EP2009/001310
§ 371 (c)(1),
(2), (4) Date: Oct. 7, 2010

(87) PCT Pub. No.: WO2009/106296
PCT Pub. Date: Sep. 3, 2009

(65) Prior Publication Data
US 2011/0033615 A1 Feb. 10, 2011

(30) Foreign Application Priority Data
Feb. 25, 2008 (EP) .................................... 08003335

(51) Int. Cl.
B25B 11/00 (2006.01)
B24B 13/005 (2006.01)
(52) U.S. Cl.
CPC ................................. B24B 13/0057 (2013.01)
USPC ........................................ 269/55; 269/289 R

(58) Field of Classification Search
USPC .................. 427/160–169; 269/55, 60, 21, 903
See application file for complete search history.

(56) References Cited

U.S. PATENT DOCUMENTS

| 4,714,232 A | 12/1987 | Blot |
| 4,925,518 A | 5/1990 | Wasserman et al. |

(Continued)

FOREIGN PATENT DOCUMENTS

DE 37 12 148 C2 11/1988

OTHER PUBLICATIONS http://www.rhodia.com/product-literature-download.
action?docId=090166368079a6f8&docLanguage=EN
&docType=TDS&output=BINARY
&productName=TECHNYL+A+218W+V30+BLACK+FA.*

(Continued)

*Primary Examiner* — Lee D Wilson
(74) *Attorney, Agent, or Firm* — Reising Ethington P.C.

(57) ABSTRACT

A block piece for holding a spectacle lens blank has a basic body with a workpiece mounting face portion against which the workpiece can be blocked with a blocking material, and a clamping portion via which the blocked workpiece can be fixed in a machine/apparatus for processing it. The basic body is made substantially of a material having a defined low water absorption and/or is sealed to at least reduce outgassing of water moisture under vacuum conditions, so that the block piece can be used also in vacuum coating processes. Alternatively or in addition, the clamping portion is constructed to be clamped by forces directed essentially perpendicular to the radial direction to cancel out each other and not deform the basic body, and/or the workpiece mounting face portion is provided with a predetermined amount of prism.

34 Claims, 7 Drawing Sheets

(56) References Cited

U.S. PATENT DOCUMENTS

| | | | |
|---|---|---|---|
| 5,210,695 | A | 5/1993 | Wood |
| 5,341,604 | A | 8/1994 | Wood |
| 5,372,357 | A * | 12/1994 | Blaimschein ............. 269/21 |
| 5,630,901 | A | 5/1997 | Yamamoto et al. |
| 5,820,116 | A * | 10/1998 | Haese ..................... 269/21 |
| 5,938,381 | A | 8/1999 | Diehl et al. |
| 6,082,298 | A | 7/2000 | Suter |
| 6,641,466 | B2 | 11/2003 | Wallendorf et al. |
| 6,712,671 | B2 | 3/2004 | Wallendorf et al. |
| 6,913,356 | B2 | 7/2005 | Belly et al. |
| 7,066,794 | B2 | 6/2006 | Granziera et al. |
| 7,066,797 | B2 * | 6/2006 | Volken et al. .............. 451/390 |
| 7,278,908 | B2 | 10/2007 | Urban et al. |
| 7,416,176 | B2 * | 8/2008 | Hamann ................ 269/266 |
| 7,440,814 | B2 | 10/2008 | McPherson et al. |
| 7,597,033 | B2 | 10/2009 | Savoie et al. |
| 7,918,440 | B2 * | 4/2011 | Schiavi et al. ............. 269/21 |
| 2008/0035053 | A1 | 2/2008 | Muster et al. |
| 2008/0132157 | A1 | 6/2008 | Schneider et al. |
| 2010/0170635 | A1 | 7/2010 | Savoie |
| 2011/0033615 | A1 * | 2/2011 | Breme et al. .............. 427/164 |

OTHER PUBLICATIONS

Optikfertigung Transportkasten fur die Brillenglasfertigung in Rezeptwerkstatten—DIN 58763, ICS 11.040.70.55.160, Jun. 1997, 2 pages.

Entwurf—DIN 58767, Optikfertigung—Zylindrischer Werkzeug- und Werkstucktrageranschluss, Juni 2005, Einspruche bis Sep. 30, 2005, ICS 37.020, 1 page.

Optikfertigung Blockstuck Durchmesser 43mm fur Brillenglasfertigung, DIN 58766, ICS 11.040.70, Jun. 1997, Marz 1998, 1 page.

Plastics Determination of water absorption, DIN EN ISO 62, ICS 83.080.01, European Standard EN ISO 62: 1999 has the status of a DIN Standard, Aug. 1999, 15 pages.

PCT/EP2009/001310—The International Search Report and the Written Opinion—Applicant: Satisloh AG—Mailing Date Apr. 15, 2009—11 pages.

* cited by examiner

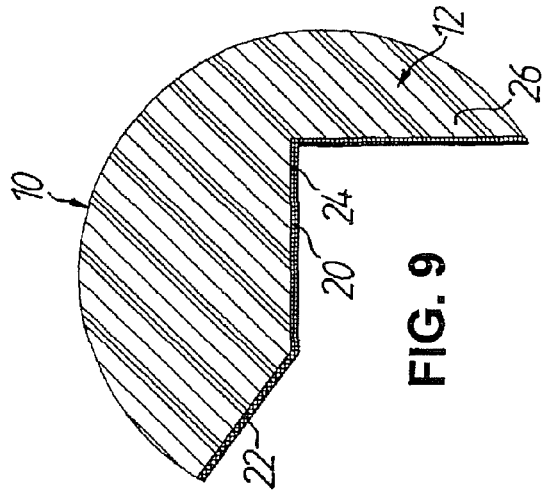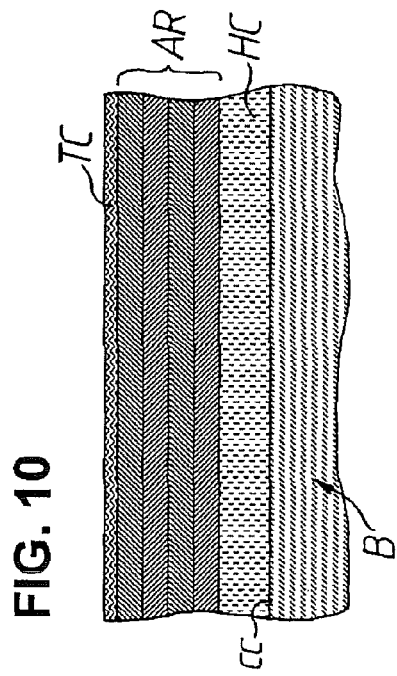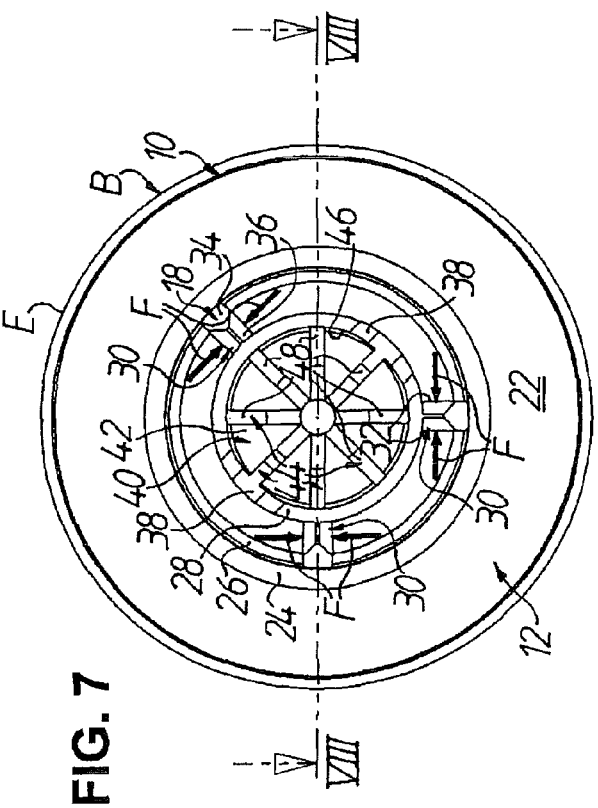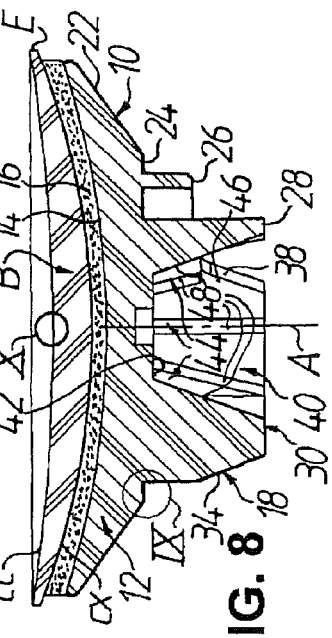
FIG. 7
FIG. 8
FIG. 9
FIG. 10

BLOCK PIECE FOR HOLDING AN OPTICAL WORKPIECE, IN PARTICULAR A SPECTACLE LENS, FOR PROCESSING THEREOF, AND METHOD FOR MANUFACTURING SPECTACLE LENSES ACCORDING TO A PRESCRIPTION

TECHNICAL FIELD OF THE INVENTION

The present invention generally relates to a workpiece support block ("block piece") for supporting an optical workpiece during the processing thereof. In particular, the invention relates to a block piece for holding a spectacle lens for processing thereof as used in production workshops for manufacturing individual spectacle lenses from customary materials (mineral glass, polycarbonate, PMMA, CR 39, HI index, etc.) according to a prescription. The invention also relates to a method for manufacturing spectacle lenses according to a prescription.

BACKGROUND OF THE INVENTION AND PRIOR ART

An ophthalmic lens blank generally has a first face with a pre-determined curvature and a second face, opposite the first face on which a desired surface contour is generated by a machining process. The overall process is generally referred to as "lens surfacing" and the overall object is to yield a finished spectacle lens so that the first and second face curvatures cooperate to yield desired optical properties. In addition to this the first and/or second faces of the lens are usually coated to provide the finished spectacle lens with an enhanced ability to resist scratching (by a "hard coating"), with a low residual reflection and a desired color (by an "antireflection coating"), and/or with certain surface properties such as hydrophobic, oleophobic and dust repelling properties (by a "top coating"). Usually also a further machining process takes place (the so-called "edging"), the aim of which is to finish-machine the edge of the spectacle lens in such a way that the spectacle lens may be inserted into a spectacle frame. In all these process steps the spectacle lens (blank) must somehow be held in the machining machine(s) and coating apparatus respectively.

In more detail, hitherto the following main process steps are usually carried out in prescription workshops: Firstly, a suitable right and/or left ophthalmic lens blank is removed from a semifinished product store. The term "semifinished" is used to mean that the spectacle lens blanks, which are usually round or oval in plan view and have not yet been edged, have already been molded, machined or in another way contoured (surfaced) on one of their two optically active faces only. The spectacle lens blanks are then prepared for the blocking operation, namely by applying a suitable protective film or a suitable protective lacquer to protect the optically active face which has already been machined or contoured, i.e. the first face or blocking face.

The so-called "blocking" of the ophthalmic lens blanks then takes place. During this, the spectacle lens blank is joined to a suitable block piece, for example a lens block according to German standard DIN 58766 or document U.S. Pat. No. 7,066,797. To this end, the block piece is firstly brought into a predefined position with respect to the protected first face of the spectacle lens blank, and then in this position the space between block piece and spectacle lens blank is filled with a molten material (normally a metal alloy or wax) or an adhesive composition that is curable, e.g., by UV or visible light, as described in the earlier U.S. Patent Application Publication 2010/0170635 by the same applicant for example. Once this material has solidified or cured, the block piece forms a holder or support for machining the second face of the spectacle lens blank. The block piece is grasped by a chuck or other suitable coupling mechanism during lens generation to provide in particular secure mounting to the profiling machine while avoiding damage to the lens.

Lens surfacing is carried out then using profiling machines which typically have a cutter of some type that is moved across the second face of the ophthalmic lens blank to give the second face its macrogeometry according to the prescription. The spectacle lens blank may be stationary or rotating during the cutting operation, depending on the particular profiling machine which is being used. Typical machining processes for surfacing spectacle lenses include single point diamond turning (as the presently preferred fine cutting process for plastic materials and described in, e.g., document U.S. Pat. No. 7,597,066 B2 by the same applicant), diamond tool flycutting, milling (as the presently preferred rough cutting process for plastic materials and described in, e.g., document U.S. Pat. No. 5,938,381 by the same applicant), and grinding processes, applied depending on the lens material.

Usually fine machining of the ophthalmic lenses then takes place, in which the pre-machined second face of the respective spectacle lens blank is given the desired microgeometry, as described, e.g., in documents U.S. Pat. Nos. 7,066,794 B2 and 7,278,908 B2 by the same applicant. Depending on inter alia the material of the spectacle lenses, the fine machining process is divided into a fine grinding operation and a subsequent polishing operation, or includes only a polishing operation if a polishable second face has already been produced during the pre-machining stage.

Only after the polishing operation is the ophthalmic lens blank separated from the lens block ("deblocking") before cleaning steps are carried out. Then the coating process takes place that, depending on among other things the material of the lens blank, may include spin (or dip) coating of the deblocked spectacle lens blank so as to provide at least the second face of the lens blank with a hard coating or the like, as described, e.g., in the earlier U.S. Patent Application Publication 2008/0035053, wherein the spectacle lens blank is held in the spin coating apparatus by a lens holder that has a suction cup for instance.

The coating includes vacuum coating of the deblocked spectacle lens blank so as to provide at least the second face of the lens blank with an antireflection coating and optionally a top coating serving the above mentioned purposes. In the vacuum coating process the spectacle lens blank is clamped to a substrate carrier of a rotary carrier device that is located in a vacuum chamber in a vertically spaced relation with respect to an evaporation source for emitting a vapor stream onto the lens blank mounted on the substrate carrier, as described, e.g., in document U.S. Pat. No. 6,082,298.

After the coating step the ophthalmic lens blank usually is edged so that the spectacle lens can be inserted into a spectacle frame. To this end, the coated spectacle lens blank is blocked again, at this time however to a different, smaller block piece by an adhesive film portion for instance, as described, e.g., in document U.S. Pat. No. 6,641,466 by the same applicant. The edging process may also include the forming of bores, grooves, channels and/or bevels corresponding to the respective mounting requirements in the edge area of the spectacle lens, as described, e.g., in document U.S. Pat. No. 6,712,671 by the same applicant.

Finally, after edging and a further deblocking step the spectacle lens is cleaned again and ready for inspection and insertion or mounting to the spectacle frame.

One disadvantage of the conventional overall process as outlined above is that the spectacle lens blank needs to be deblocked after surfacing prior to coating, and then again blocked after coating prior to edging. These steps require manual operations that are time-consuming and labor-intensive.

In this connection, documents U.S. Pat. Nos. 5,210,695 A and 5,341,604 A disclose a system providing a lens blank and block assembly capable of being mounted in any of a surface generating machine, a finishing, i.e. lapping or polishing apparatus and an edging machine without requiring re-blocking of the lens in order to compensate for axis shifts, wherein the lens block is formed from a plastic material capable of being readily cut together with the lens blank in the edging machine. The proposed lens block however is not intended or suitable to be used in coating processes, in particular vacuum coating processes.

In this regard, document U.S. Patent Application Publication 2008/0132157 proposes a block piece for holding an optical lens to be machined, with a coupling part for holding in a workpiece chuck and with a holding part for fastening the lens, the latter having a convex or concave holding surface corresponding to a first side of the lens, wherein the holding surface is, according to the shape of the lens to be held, provided in the form of a negative aspherical, toric, progressive or free-form surface, and the block piece is made from a plastic material that can be machined. Although this document generally mentions that the lens can remain on the block piece during a coating process, it does not disclose or address how this could be done in a vacuum coating process in which the lens is subjected to a vacuum of, e.g., $5*10^{-3}$ mbar. It can be expected that liquids from the surfacing and cleaning processes will remain in particular in the "equalizing and pressure medium channels" provided in the proposed block piece, which liquids can excessively prolong the time required to reach, if at all, the necessary vacuum and in addition may lead to impure coating conditions resulting in an imperfect coating.

Another problem with the conventional overall process as outlined above is that, in particular if the block piece is made from a plastic material, and the block piece is supported in the surfacing machine by a collet chuck or the like which applies a radial compression force thereon, the block piece may assume a shape other than that which it naturally assumes in the absence of these forces. Such deformation may transfer to the spectacle lens blank blocked on the block piece so that the curve which is cut into the surface of the lens blank may become distorted when the block piece is removed from the chuck and the lens blank is deblocked from the block piece and resumes its natural shape. This problem becomes particularly acute in the manufacture of free-form spectacle lenses requiring very precise tolerances. Any slight distortion of the curve upon deblocking the spectacle lens from the block piece may take it out of the tolerance range of the particular prescription, thereby rendering it useless for its desired purpose and resulting in substantial waste.

Still another problem with the conventional process in prescription workshops is associated with in particular the single point diamond turning as the presently preferred fine cutting process for spectacle lens blanks made from plastic materials. This surfacing process as such is susceptible to small, but unacceptable errors at the center of rotation of the lens blank that are typically caused by errors of machine and tool calibration, as explained in great detail in document U.S. Pat. No. 7,440,814 by the same applicant. This, coupled to certain limitations of the subsequent flexible, polishing process, where it can be difficult to totally "clean up" or remove such center errors, have led to certain limitations in the amount of prism (i.e. surface tilt or shift with respect to the axis of rotation) permissible to cut and polish in such combined surfacing process. Experiments have shown that it can be relatively easy to cut and polish surfaces having 2 to 3 degrees of prism at the center with accurate centers, however greater amounts of prism at the center can pose problems.

A known method (see, e.g., document U.S. Pat. No. 6,913, 356 B2) for fitting a block piece to a semifinished blank of an ophthalmic lens intended to have a particular prism generally consists of positioning the lens blank on a fixed base, in a centered and angularly defined manner, so that the finished face of the lens blank bears conjointly on a plurality of bearing points of the base, defining an orientation of the block piece relative to the lens blank, orienting the block piece in the defined manner, and fixing the block piece to the finished face while maintaining orientation, by with a castable low melting point metal alloy as the blocking material.

Once the lens blank is blocked on the block piece with the predetermined amount of prism that the spectacle lens shall have after surfacing, there is no need to generate, i.e. cut any prism during the surfacing process. However, one disadvantage of this known approach consists in the fact that, if the lens blank is blocked with a greater amount of prism, say 7 or 8 degrees of prism, the thickness of the wedge-shaped layer of blocking material between lens blank and block piece strongly varies along the prism axis. This gives rise to a different amount of shrinkage of the blocking material in the thickness direction along the prism axis when it solidifies (or cures if an adhesive composition would be used), which shrinkage in turn may bend or distort or even shift with respect to the block piece the blocked lens blank—as described in the earlier U.S. Patent Application Publication 2010/0170635 by the same applicant—so that, again, the curve which is cut into the surface of the lens blank may become distorted when the lens blank is deblocked from the block piece and resumes its natural shape. For this reason the amount of prism permissible to be blocked is also limited in the known approach.

SUMMARY OF THE INVENTION

In accordance with one aspect of the present invention, a block piece for holding an optical workpiece, in particular a spectacle lens, for processing thereof, serves to solve the drawbacks previously cited of the techniques known in the art and enables in particular spectacle lenses with high optical qualities to be produced more quickly and at lower cost, without restrictions as to the lens geometries usually processed in prescription workshops. Another aspect of the invention further encompasses the provision of a method for manufacturing spectacle lenses according to a prescription that serves the above purposes.

According to one aspect of the present invention there is provided a block piece for holding an optical workpiece, in particular a spectacle lens, for processing thereof, comprising a basic body that has a workpiece mounting face portion against which the workpiece can be blocked by a blocking material, and a clamping portion via which the workpiece blocked on the basic body can be fixed in a machine or apparatus for processing of the workpiece; wherein the basic body consists of mineral glass or a plastic material that has a water absorption of less than 1% at saturation, measured in accordance with DIN EN ISO 62:1999-08, method 1 (determination of water content absorbed after immersion in water at 23° C.), and/or the basic body is sealed by a coating and/or tape that serves to prevent or at least reduce outgassing of any water moisture trapped within the material of the basic body under vacuum conditions, so that the block piece is adapted to be used also in thin film coating processes.

All three alternatives—basic body substantially or entirely made of mineral glass, basic body made of plastic with a defined low water absorption according to the above standard, and basic body of whatever material that is at least partially sealed against outgassing—have in common that the respective block piece can be used and remain on the lens blank in a vacuum thin film coating process without the risk that, once the blocked lens blank has been put into the vacuum chamber of the coating apparatus and the vacuum chamber is evacuated, there will be an excessive outgassing of water that may otherwise be present in the block piece because of diffusion phenomena during storage of the block pieces and/or the preceeding surfacing operations in which water-containing cooling lubricants, abrasive suspensions and the like are normally being used. It is clear that the block piece because of its material and/or sealing will not absorb water to a greater extent prior to the coating process and accordingly not give off water to a greater extent in the vacuum chamber under vacuum conditions; in this respect the sealing may also serve to trap any excessive water in the block piece and to prevent it from outgassing under vacuum conditions. Thus, any water outgassing in the coating apparatus, if at all, is not detrimental to the coating process because the amount of outgassing water would be so small that it would not prevent the necessary process vacuum from being reached and this without delay, i.e. without prolonged "vacuum pumping times", that it would not lead to an impure coating "environment" and resulting imperfect coatings, and that it would not accumulate in the vacuum chamber of the coating apparatus to an extent which would reduce the efficiency of coating.

Since the lens blank can therefore remain on the block piece during the vacuum thin film coating process, the block piece can advantageously be used to support the lens blank on the respective substrate carrier in the coating apparatus, e.g., by the block piece and substrate carrier having matching or complementary shaped clamping/holding portions.

Further advantages of mineral glass as the block piece material lie in the fact that mineral glass is a low-cost and very stiff material which is not susceptible to undesirable deformations due to clamping and cutting forces that directly or indirectly act on the block piece in particular in the surfacing process. Such block piece could also be reused, thus helping to reduce costs in prescription workshops, wherein cleaning of the used block piece for the next use including removal of the blocking material or residues thereof could be performed very easily. If however the block piece shall also be used in an edging process the plastic material would be preferred for the block piece over mineral glass since the latter cannot be cut by milling and thus could unintentionally damage the edging tool.

Preferably the basic body of the block piece consists of an essentially pure (i.e. containing no foreign bodies like fillers) plastic material selected from a group comprising Polyethylene Terephthalate (PET) and Polycarbonate (PC). These low-cost plastic materials as such have a very low water absorption and are easily available on the market.

As an alternative, the basic body of the block piece can consist of or be substantially made from a preferably low-cost plastic material of whatever kind—e.g. Polymethyl Methacrylate (PMMA)—containing a filler to reduce water absorption within the basic body. In this instance possible filler materials include glass fibers, mineral/glass beads and/or granulates, the respective fill volume being chosen such that the filled plastic material has a water absorption of less than 1% at saturation, measured in accordance with DIN EN ISO 62:1999-08, method 1 (with the immersion time scale comprising period(s) of 24 h, 48 h, 96 h, 192 h, etc. as in the first-mentioned case and proposed in this standard). To this end, as a further alternative or in addition, the plastic material could also contain an additive for water scavenging via a chemical process, for instance p-Toluenesulfonyl Isocyanate (PTSI), or a carbodiimide such as dicyclohexylcarbodiimide or diisopropylcarbodiimide, or the like.

In the case where the basic body of the block piece is at least partially sealed by the coating and/or tape the basic body preferably consists of an essentially pure PMMA, again as a low-cost plastic material that is easily available on the market. In this instance the coating for sealing the basic body preferably is selected from a group comprising acrylates and epoxies, one example being a UV curable coating designed for spin coating applications that is available under the product name "SHC-178" from the U.S. company Lens Technology International, and suitable for forming an essentially diffusion tight barrier.

Preferably the plastic material of the basic body of the block piece is injection moldable so that the block piece can be produced in an extremely cost-effective manner in mass production.

It is further preferred for the basic body of the block piece and, if present, the coating and/or tape for sealing the basic body to be capable of transmitting UV or visible light (VIS). This advantageously allows to direct UV or VIS through the block piece in order to cure a UV/VIS radiation curable adhesive composition as the blocking material, as disclosed in the earlier U.S. Patent Application Publication 2010/0170635 by the same applicant.

Continuing the concept of the invention the basic body of the block piece may be formed to be free of undercuts and narrow channels in which liquids could be trapped. This facilitates the cleaning and any drying operations (e.g. in a conventional drying oven) for the block piece prior to the coating process.

Preferably the workpiece mounting face portion of the block piece is free of cut-outs to provide full support of the blocked workpiece. This measure serves to prevent undesirable deformations of the blocked lens blank due to the machining forces exerted on the lens blank during the surfacing and any edging process, thus helping to obtain processed spectacle lenses of high optical quality.

According to a further aspect of the present invention there is provided a block piece for holding an optical workpiece, in particular a spectacle lens, for processing thereof, comprising a basic body that has a central axis, a workpiece mounting face portion against which the workpiece can be blocked by a blocking material, and a clamping portion via which the workpiece blocked on the basic body can be fixed in a machine or apparatus for processing of the workpiece; wherein the workpiece mounting face portion is essentially spherical in shape and tilted or shifted by a predetermined amount with respect to the central axis of the basic body in order to provide a defined amount of prism in the block piece.

For instance, 2 degrees of prism could be provided in the block piece by tilting the workpiece mounting face portion of the block piece by 2 degrees with respect to the central axis of the basic body. All lens blanks subsequently blocked on these "pre-blocked prism" (PBP) block pieces would therefore start with 2 degrees of prism assuming the lens blank is blocked on the respective PBP block piece in such orientation that the prism axis of the spectacle lens to be manufactured according to the prescription is aligned with the prism direction of the PBP block piece. Knowing the orientation of the prism direction of the PBP block piece relative to the block mounting features (datums) that are usually defined by the geometry of the clamping portion of the block piece, one can calculate to increase or decrease the amount of prism cut in the final lens by adding to or subtracting from the prism in the PBP block piece. This can essentially be used to effectively decrease the total prism to be surfaced by the prism angle in the PBP block piece, in order to address the above described limitations of a combined surfacing process in which a spectacle lens blank made from a plastic material is fine cut by single point diamond turning and then polished with the aid of a flexible polishing tool.

If for instance the maximum amount of prism that can safely be cut with no excessive center defect in such combined surfacing process would be 3 degrees, while the maximum prism that should be supported in the surfacing process would be 5.5 degrees, the PBP block piece would be provided with 2.5 degrees of pre-blocked prism. Thus, all lens blanks blocked on these PBP block pieces would have 2.5 degrees of prism tilt in a known direction. Then, this 2.5 degrees of prism could be cancelled out by cutting −2.5 degrees of prism to end up with a lens of 0 degrees of prism, or prism could be added to the 2.5 degrees of pre-blocked prism by cutting up to 3 degrees of prism to obtain a total of 5.5 degrees of prism, i.e. without cutting more than the above limit of 3 degrees of prism. As a result, any prism angle in between +/−3 degrees could safely be cut to obtain between 0 and 5.5 degrees of prism in the final lens. In the prescription workshop the lens layout calculation program would then need to keep track of the placement of the cylinder axis according to the prescription relative to the prism axis as the PBP block piece has a fixed prism orientation, but a variable cylinder axis orientation relative to the block reference geometry, unlike the conventional surfacing technology where the cylinder axis is aligned in a fixed orientation relative to the block reference geometry, and the prism alignment is variable. This implies that such a PBP block piece is primarily used for "flexible" polishing as opposed to conventional hard lap polishing requiring a fixed cylinder axis orientation.

In addition, such a PBP block piece also addresses the above described problems that are associated with a strong thickness variation in any wedge-shaped layer of blocking material between lens blank and block piece. It is evident that, even if the final lens shall have a greater amount of prism, say, e.g., the above 5.5 degrees of prism, with the PBP block piece the thickness of the layer of blocking material along the prism axis does not vary as strongly as would be the case if a block piece without prism in the workpiece mounting face portion was used. In the example the wedge angle between lens blank and block piece would only amount to 3 degrees with the PBP block piece having 2.5 degrees of prism in the workpiece mounting face portion, whereas it would amount to 5.5 degrees without prism in the workpiece mounting face portion of the block piece. Consequently also the risk that any shrinkage of the blocking material upon solidifying or curing will distort the blocked lens blank and/or change the desired prism is minimized by using the PBP block piece.

In this connection an advantageous secondary effect is that, because the gap between lens blank and block piece that must be filled with the blocking material is minimized by using the PBP block piece, also the amount of blocking material necessary for this purpose is minimized, again helping to reduce costs in prescription workshops.

According to a still further aspect of the present invention there is provided a block piece for holding an optical workpiece, in particular a spectacle lens, for processing thereof, comprising a basic body that has a central axis, a workpiece mounting face portion against which the workpiece can be blocked by a blocking material, and a clamping portion via which the workpiece blocked on the basic body can be fixed in a machine or apparatus for processing of the workpiece; wherein the clamping portion is adapted to be clamped by clamping forces that are directed essentially in a circumferential direction with respect to the central axis of the basic body, or essentially in a tangential direction at a distance with respect to the central axis of the basic body.

The main effect of this block piece design is that, even if the block piece would be made from a rather soft plastic material, the clamping forces that are exerted on the block piece in the circumferential or tangential direction by a correspondingly adapted chuck in the surfacing or edging machine do not "travel" or pass through the whole block piece as in the conventional case where a radial compression force is applied to the clamping portion of the block piece, thereby avoiding any excessive deformation of the block piece that could transfer to the workpiece blocked on the block piece and cause any undesirable distortion of the finished workpiece geometry. Again, this helps to manufacture in, e.g., prescription workshops spectacle lenses with high optical qualities.

In one embodiment the clamping portion of the basic body may comprise at least one radially extending clamping protrusion that has two opposed side faces each facing in the circumferential direction, for application of the clamping forces. Preferably the clamping portion of the basic body comprises three radially extending clamping protrusions that are distributed over the perimeter. This could be a uniform distribution; preferred however would be a non-uniform distribution of the clamping protrusions over the perimeter so that the clamping protrusions can also serve to rotationally orient the block piece in the machining machine.

It is further preferred for the clamping protrusions of the clamping portion to each have a radial outer face that is inclined with respect to the central axis of the basic body so that the radial outer faces together define an outer conical centering portion of the basic body, corresponding to German standard DIN 58766, for centering the block piece in the assigned chuck of the respective machining machine.

Further, the clamping protrusions preferably each have an axial end portion facing away from the workpiece mounting face portion, wherein the axial end portions each have a V-shaped cross-section seen in the radial direction, again serving to facilitate the mounting of the block piece in the assigned chuck of the respective machining machine.

In a preferred embodiment of the block piece, on a side facing away from the workpiece mounting face portion, the basic body comprises two annular portions of different diameter that are concentrically arranged about the central axis of the basic body, the radial inner annular portion protruding beyond the radial outer annular portion in the axial direction, wherein the clamping protrusions extend between the annular portions. Such design is particularly advantageous if the block piece shall be injection molded from a plastic material since it serves to provide for essentially uniform wall thicknesses throughout the basic body thereby avoiding shrinkage related problems in the injection molding process. In this embodiment the clamping protrusions, by extending between the annular portions or bridging across the annular gap therebetween, advantageously also serve to stiffen or reinforce the basic body of the block piece. A further advantage of this embodiment is that the block piece, owing to its "honeycombed" structure already, has a low weight so that there are lower moving masses on the workpiece side during machining of the blocked workpiece compared to conventional block pieces, e.g., the block piece according to German standard DIN 58766.

In this instance the radial inner annular portion of the basic body may be provided with two cut-outs that are arranged on diametrically opposed sides with respect to the central axis of the basic body, for cylinder axis alignment of the block piece on a spindle of a machining machine, corresponding to German standard DIN 58766.

In this embodiment the radial inner annular portion of the basic body may further define a central cylindrical blind hole having a flat bottom, wherein a plurality of stiffening ribs extends between the bottom and an inner circumference of the radial inner annular portion. In this instance the stiffening ribs preferably each have a radial inner face that is inclined with respect to the central axis of the basic body, wherein the radial inner faces together define an inner conical centering portion of the basic body, again corresponding to German standard DIN 58766, so that the block piece as a whole is compatible with standard chuck situations, including the reception in handling devices and in job trays (e.g. such as described in German standard DIN 58763).

The invention also provides for a method for manufacturing spectacle lenses according to a prescription, comprising the steps of: (i) blocking a lens blank with a blocking face on a workpiece mounting face portion of a block piece with the aid of a blocking material, the lens blank having a second face, opposite the blocking face, and an edge between the blocking face and the second face, (ii) processing the blocked lens blank on the second face and, if required, the edge to obtain a processed lens, and (iii) deblocking the processed lens from the block piece; wherein one and the same block piece as described above is used on which the blocked lens blank remains throughout step (ii).

Since the spectacle lens blank remains on the block piece throughout the whole processing step the latter can be carried out faster and more efficient with less handling effort as compared to the conventional approach where the lens blank needs to be deblocked and blocked again in the processing stage. This reduces the manufacturing costs and even allows for more automation in the prescription workshops. The approach according to the invention also serves to ensure the production of spectacle lenses with high optical qualities because one and the same geometrical relation between lens blank and block piece is maintained throughout the whole processing stage, thus any errors that are consequential on the conventional re-blocking approach where the orientation of the lens blank relative to the assigned different block pieces may unintentionally change upon re-blocking are avoided. Further, as the lens blank is always held on the block piece as standardized interface and handling device during the processing stage the risk that any operator unintentionally touches the lens blank—thereby possibly causing problems in a coating substep—is reduced. A further advantage is that all production information can be kept on the block piece, for instance by a "transponder" integrated in or fixed to the block piece, as proposed in the generic document U.S. Pat. No. 7,066,797, which offers full tracking possibility throughout the whole process.

Continuing the concept of the invention, the above processing step (ii) may comprise the following substeps: machining of the blocked lens blank to give the second face a macrogeometry according to the prescription; fine machining of the blocked lens blank to give the second face the required microgeometry; cleaning the blocked lens blank that has been machined and fine machined; if required, spin or dip coating of the blocked lens blank in order to provide the second face with a hard coating, or a primer, or a primer and a hard coating; vacuum coating of the blocked lens blank to provide an antireflection coating and, if required, a top coating such as hydrophobic and/or oleophobic and/or dust repelling coating on the second face; and, if required, edging of the blocked lens blank to give the edge the required geometry so that the processed lens is ready for insertion into a spectacle frame or a spectacle holder. Since there is no deblocking step in the processing stage any more, some processing substeps could even be carried out in a—as compared to the conventional time sequence—different sequence where a certain fixed sequence is not necessary from a product point of view, in particular all machining operations including edging could be carried out prior to the coating process(es) if desired or required.

Finally, it is preferred for the blocking face of the lens blank to be fully finished prior to the above blocking step (i), including hard coating, antireflection coating and, if required, top coating such as hydrophobic and/or oleophobic and/or dust repelling coating. In this instance the blocked spectacle lens blank could advantageously be shipped from the lens manufacturer to the prescription workshop where only the second face and, if required, the edge of the lens blank would need to be processed to obtain a spectacle lens ready for insertion into/mounting to the spectacle frame, wherein the first face of the lens blank would be protected by the block piece until the finished spectacle lens is deblocked. This approach would also minimize the production efforts in the prescription workshop.

Further effects and advantages of the proposed block piece (s) and method for manufacturing spectacle lenses according to a prescription will become apparent to the skilled person from the following description of currently preferred examples of embodiment of the invention.

BRIEF DESCRIPTION OF THE DRAWINGS

Hereinbelow, the invention will be explained in more detail on the basis of preferred examples of embodiment and with reference to the appended, partially schematic drawings. In the drawings:

FIG. 7 shows a view from below of the block piece of FIG. 1 on a reduced scale compared to the previous figures, with a spectacle lens blank as optical workpiece blocked thereon by an adhesive composition;

FIG. 8 shows a sectional view of the block piece and of the spectacle lens blank of FIG. 7 blocked thereon, along the section line VIII-VIII in FIG. 7;

FIG. 9 is an enlarged view of detail IX in FIG. 8, illustrating in section a coating that may be applied to the block piece for sealing it;

FIG. 10 is an enlarged view of detail X in FIG. 8, illustrating an example for a coating that may be applied to the concave and/or convex face of the spectacle lens blank;

DETAILED DESCRIPTION OF PREFERRED EMBODIMENTS OF THE INVENTION

Figure 1:
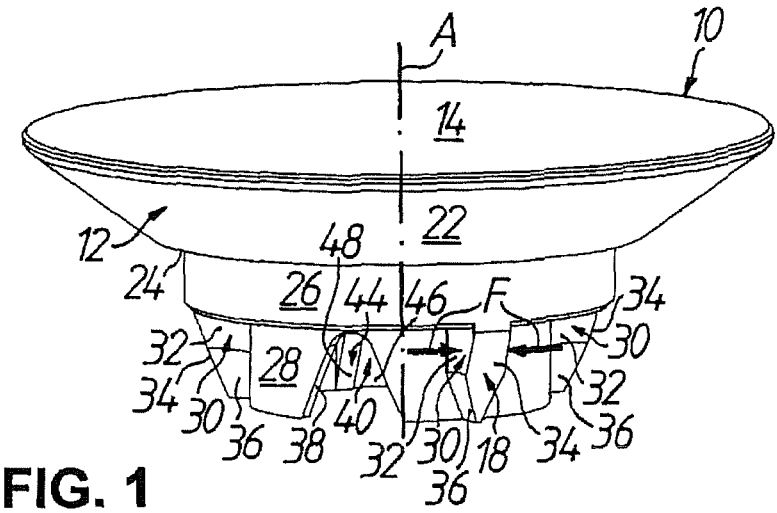
FIG. 1 shows a perspective view of a block piece according to a first example of embodiment of the invention obliquely from the front/top, which is shown on an enlarged scale compared to the actual size.
Figure 2:
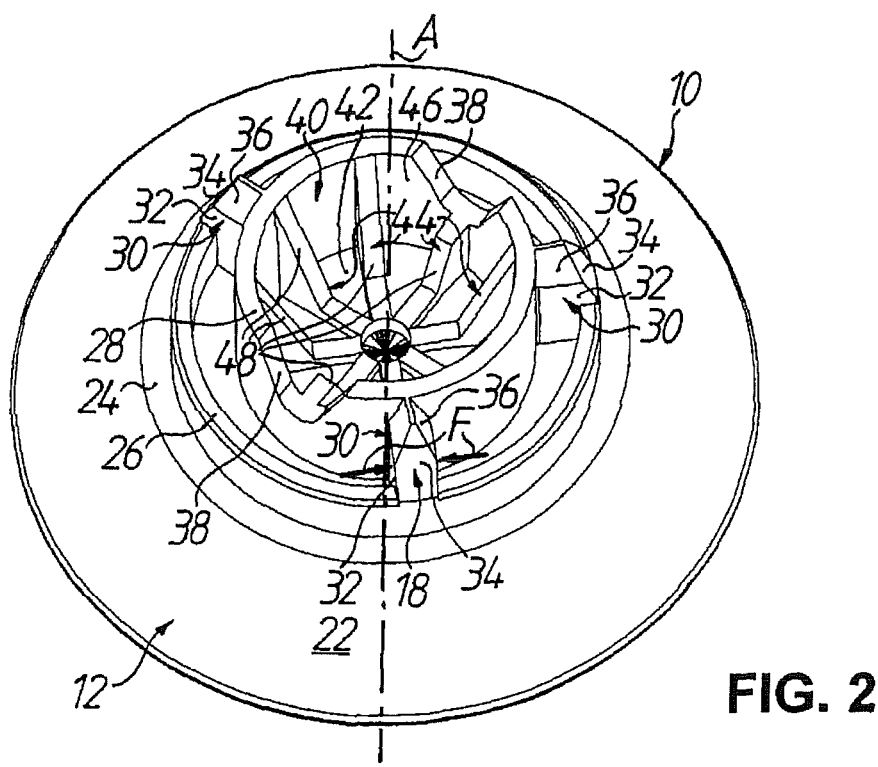
FIG. 2 shows a perspective view of the block piece of FIG. 1 obliquely from behind/below.
Figure 3:
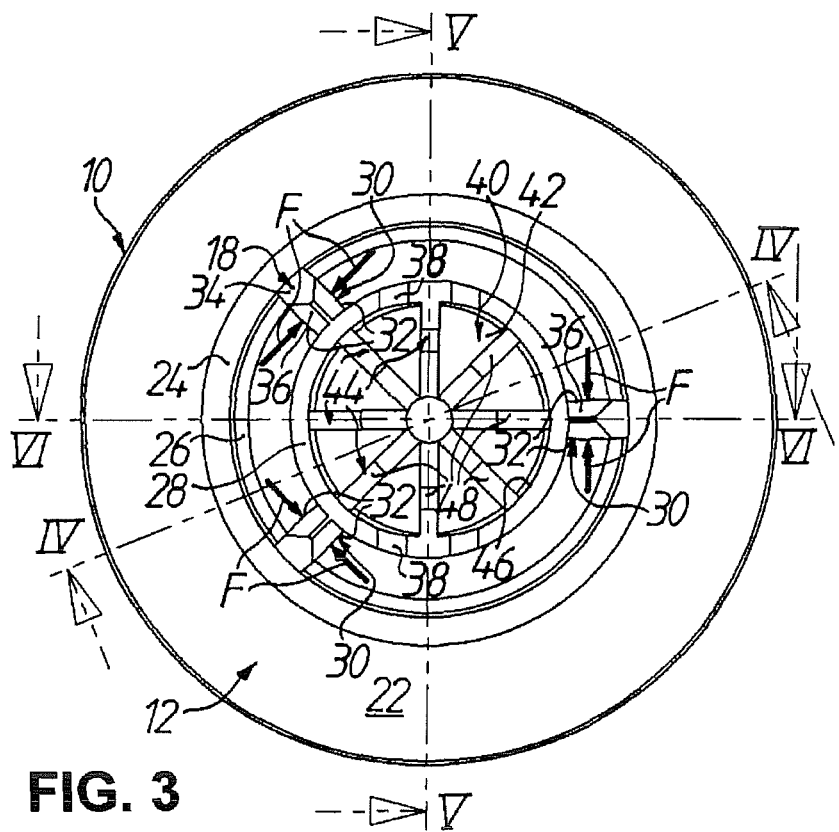
FIG. 3 shows a view from below of the block piece of FIG. 1.

FIGS. 1 to 6 show a block piece 10 for holding an optical workpiece, in particular a spectacle lens blank B (cf. FIGS. 7 and 8), for processing thereof. The block piece 10 comprises a basic body 12 that has a workpiece mounting face portion 14 against which the spectacle lens blank B can be blocked by a blocking material 16 (see FIG. 8), preferably a UV and/or VIS curable adhesive blocking composition as disclosed in the earlier European patent application 07 013 158.6 by the same applicant. The basic body 12 of the block piece 10 further comprises a clamping portion 18 via which the spectacle lens blank B blocked on the basic body 12 can be fixed in a machine or apparatus for processing (i.e. surfacing, coating, edging, tinting, cleaning, etc., as the case may be) of the spectacle lens blank B.

As to the material of the basic body 12 that allows the block piece 10 to be used in vacuum thin film coating processes, reference is made to the introductory portion of the description. In the examples of embodiment shown the basic body 12 is injection molded as one piece from a plastic material that is capable of transmitting UV and VIS for the curing of the blocking material 16, and has a water absorption of less than 1% at saturation, measured in accordance with DIN EN ISO 62:1999-08, method 1 (determination of water content absorbed after immersion in water at 23° C.). Only FIGS. 8 and 9 illustrate that the basic body 12 could also be sealed by a sealing coating 20 (or tape, as the case may be) which at least partially covers the outer surface of the basic body 12 so as to prevent or at least reduce outgassing of any water moisture trapped within the material of the basic body 12 under vacuum conditions. As to materials suitable for the sealing coating 20, reference is made again to the introductory portion of the description. It is clear that such sealing coating 20, if present, should cover those surface portions of the basic body 12 that are exposed to the "environment" in the vacuum chamber of the apparatus for coating the spectacle lens blank B.

As can be seen in particular from FIGS. 4 to 6 and 8, the workpiece mounting face portion 14 on the front side of the block piece 10 is essentially spherical in shape and free of cut-outs to provide full support of the blocked spectacle lens blank B, nearly up to the edge E between the (in this instance convex) first or blocking face cx and the (in this instance concave) second face cc of the blocked spectacle lens blank B. It can also be seen from these figures that the basic body 12 as a whole is formed to be free of undercuts and narrow channels in which liquids could be trapped.

Adjoining the workpiece mounting face portion 14 of the basic body 12 on the outer circumference side is an essentially conical transition face 22 that leads to an essentially flat back face 24 on the back side of the block piece 10. Starting from the back face 24 of the basic body 12 the latter is provided with two annular portions 26, 28 of different diameter that are concentrically arranged about a central axis A of the basic body 12, wherein the radial inner annular portion 28 protrudes beyond the radial outer annular portion 26 in the axial direction, as becomes apparent from FIGS. 1, 4 to 6 and 8 in particular.

An important feature of the block piece 10 is that the clamping portion 18 of the basic body 12 is adapted to be clamped by clamping forces that are directed essentially in a circumferential direction with respect to the central axis A of the basic body 12, or essentially in a tangential direction at a distance with respect to the central axis A of the basic body 12. To this end the clamping portion 18 of the basic body 12 comprises at least one, in the examples of embodiment shown three radially extending clamping protrusions 30 that are non-uniformly distributed circumferentially, each protrusion 30 starting from the back face 24 of the basic body 12, bridge across the annular gap between the radial outer annular portion 26 and the radial inner annular portion 28. Each clamping protrusion 30 has two opposed side faces 32 each facing in the circumferential direction, for application of the above clamping forces that are schematically shown by arrows at F in FIGS. 1 to 3 and 7. It is evident that the clamping forces F cancel out each other at the respective clamping protrusion 30, without passing through the whole basic body 12. Therefore, the clamping forces F do not bend the block piece 10 and accordingly do not distort the workpiece mounting face portion 14 and the spectacle lens blank B blocked thereon.

Further, the clamping protrusions 30 each have a radial outer face 34 that is inclined with respect to the central axis A of the basic body 12, wherein the radial outer faces 34 together define an outer conical centering portion of the basic body 12, adjoining the outer circumference of the radial outer annular portion 26. Finally, the clamping protrusions 30 each have an axial end portion 36 facing away from the workpiece mounting face portion 14, wherein the axial end portions 36 each have a V-shaped cross-section seen in the radial direction to form a "roof"-shaped end, again for centering purposes in the assigned chuck (not shown) of the respective machining machine.

Figure 4:
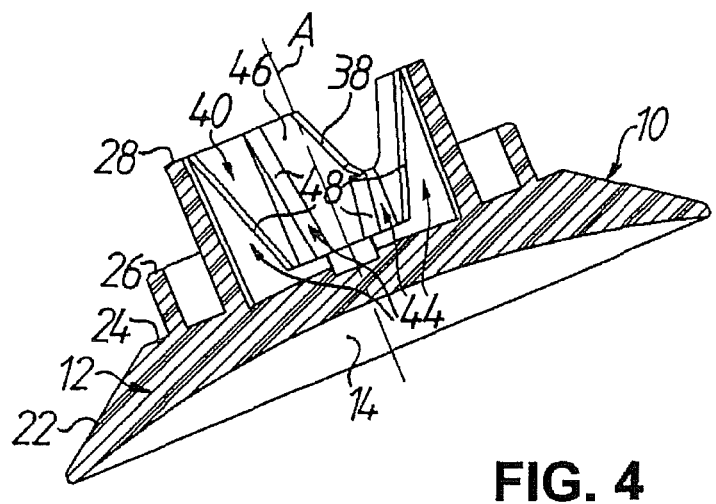
FIG. 4 shows a sectional view of the block piece of FIG. 1 along the section line IV-IV in FIG. 3.
Figure 5:
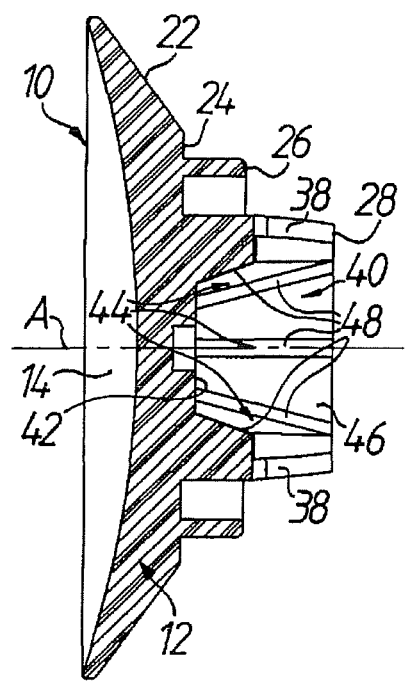
FIG. 5 shows a sectional view of the block piece of FIG. 1 along the section line V-V in FIG. 3.
Figure 6:
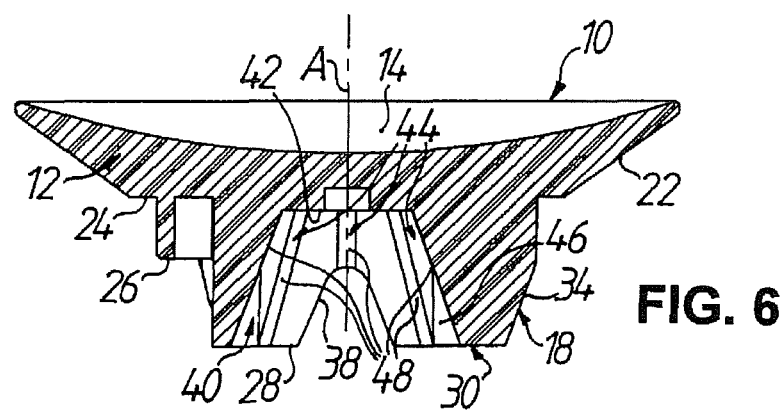
FIG. 6 shows a sectional view of the block piece of FIG. 1 along the section line VI-VI in FIG. 3.
Figure 11:
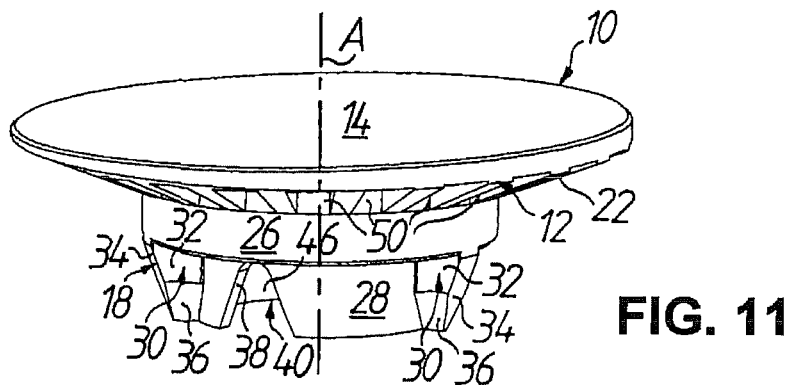
FIG. 11 shows a perspective view of a block piece according to a second example of embodiment of the invention obliquely from the front/top, which is shown on a scale that nearly corresponds to the actual size.
Figure 12:
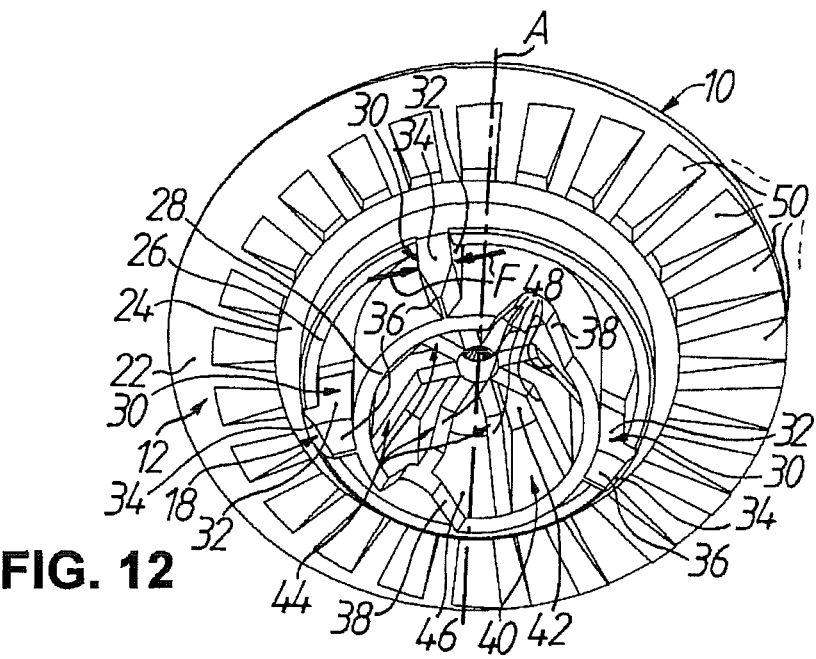
FIG. 12 shows a perspective view of the block piece of FIG. 11 obliquely from behind/below.
Figure 13:
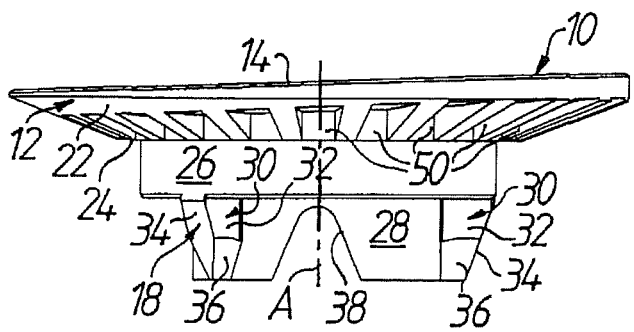
FIG. 13 shows a side view of the block piece of FIG. 11.
Figure 14:
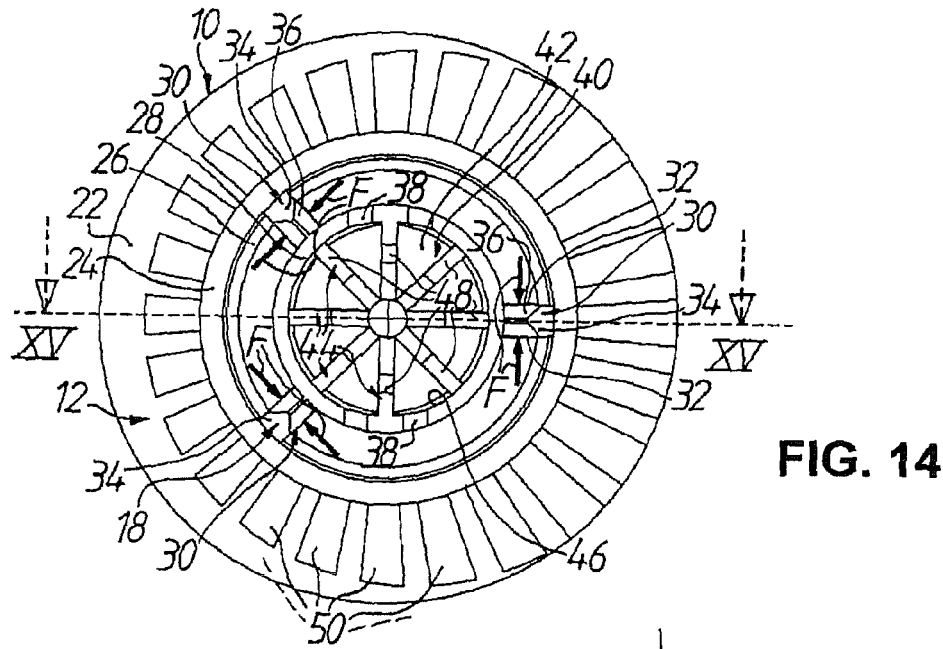
FIG. 14 shows a view from below of the block piece of FIG. 11.
Figure 15:
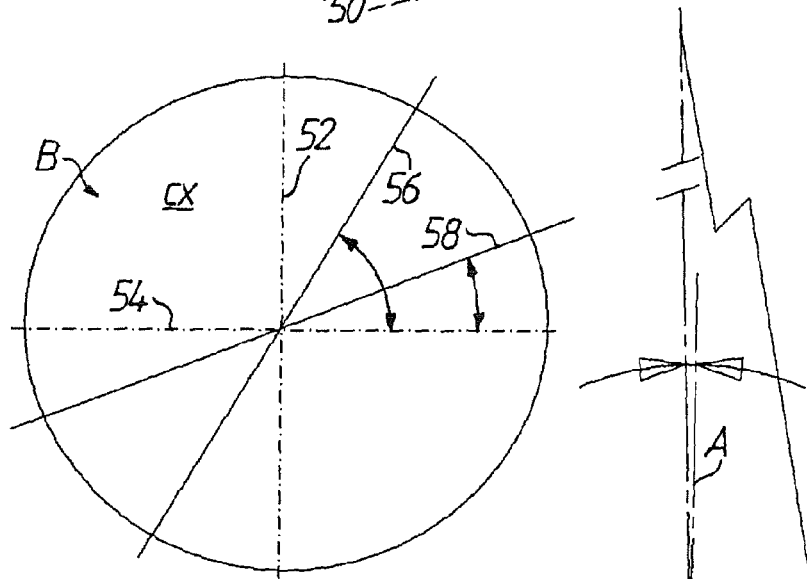
FIG. 15 is a sectional view of the block piece of FIG. 11 along the section line XV-XV in FIG. 14, illustrating how the essentially spherical workpiece mounting face portion of the block piece is tilted with respect to the central axis of the block piece to provide a predetermined amount of prism in the block piece.

As can best be seen in FIGS. 1, 2, 4 and 6, the radial inner annular portion 28 of the basic body 12, starting from its free end, is provided with two cut-outs 38 for cylinder axis alignment of the block piece 10 on the spindle of the respective machining machine, corresponding to German standard DIN 58766, which cut-outs 38 are arranged on diametrically opposed sides with respect to the central axis A of the basic body 12, and taper essentially in a V-shaped manner towards the back face 24 of the basic body 12 to stop in the axial direction in front of the radial outer annular portion 26 as seen in a side view (cf. FIGS. 4 to 6).

Furthermore, the radial inner annular portion 28 of the basic body 12 defines a central cylindrical blind hole 40 having an essentially flat bottom 42, wherein a plurality of stiffening ribs 44 extends between the bottom 42 and an inner circumference 46 of the radial inner annular portion 28. The stiffening ribs 44 each have a radial inner face 48 that is inclined with respect to the central axis A of the basic body 12, wherein the radial inner faces 48 together define an inner conical centering portion of the basic body 12. As a result, when the basic body 12 is rotated about the central axis A, the outer circumference of the radial outer annular portion 26, the radial outer faces 34 and the axial end portions 36 of the clamping protrusions 30, the back face of the radial inner annular portion 28 and the radial inner faces 48 of the stiffening ribs 44 together define an "envelope" body, the geometry of which basically corresponds to the geometry of the block piece according to German standard DIN 58766, although the present block piece 10 due to its material and its "honeycombed" structure is much lighter than the standard block piece. This geometry of the basic body 12 together with the cut-outs 38 provided in the radial inner annular portion 28 makes the block piece 10 compatible with standard chuck situations.

With regard to the actual blocking operation, the result of which is shown in FIGS. 7 and 8, explicit incorporation by reference is made to the earlier U.S. Patent Application Publication 2010/0170635 by the same applicant, disclosing a blocking apparatus that could be used and the currently preferred approach for blocking.

The following describes the second example of embodiment of the block piece 10 with reference to FIGS. 11 to 16 only insofar as it differs from the first example of embodiment whereby the same reference numbers identify the same or equivalent components or parts.

The back side of the basic body 12 according to the second example of embodiment of the block piece 10 differs from the back side of the basic body 12 according to the first example of embodiment only in that the conical transition face 22 is provided with a plurality of recesses 50 that are uniformly distributed over the circumference, and serve to provide for essentially uniform wall thicknesses throughout the basic body 12 thereby avoiding shrinkage related problems in the preferred plastic injection molding process. Basically, however, the back side of the block piece 10 according to the second example of embodiment could also be formed different, for instance as disclosed in the generic document EP 1 593 458 A2.

The more important difference is on the front side of the basic body 12. As can be seen best in FIGS. 13 and 15, the workpiece mounting face portion 14 that is essentially spherical in shape again, is tilted or shifted by a predetermined amount with respect to the central axis A of the basic body 12 in order to provide a defined amount of prism in the block piece 10. In the example of embodiment shown the workpiece mounting face portion 14 is tilted by 2 degrees with respect to the central axis A. Such prism in the geometry of the block piece 10 can be used as explained in great detail in the introductory portion of the description to which reference is made in this regard at this point.

The actual blocking operation basically can be carried out as described in the earlier U.S. Patent Application Publication 2010/0170635 by the same applicant which is incorporated by reference. It should be pointed out here that the block piece 10 with inherent prism ("pre-blocked prism" (PBP) block piece) needs a different orientation with respect to the lens blank B as compared to the conventional approach, as will be explained with reference to FIG. 16.

Figure 16:
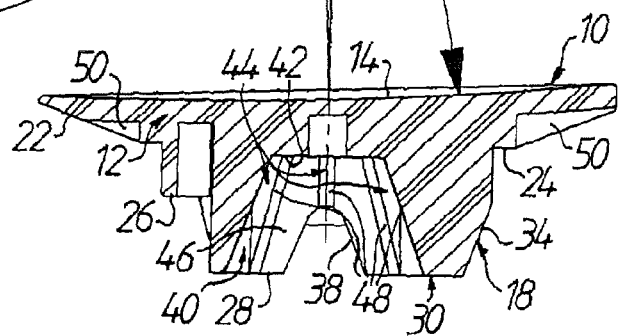
FIG. 16 shows a plan view of a spectacle lens blank with its horizontal and vertical mounting axes, a prescribed prism axis and a prescribed cylinder axis.

FIG. 16 shows a plan view of a spectacle lens blank B with its vertical axis 52 and its horizontal axis 54 corresponding to the mounting axes of the finished spectacle lens in a spectacle frame. It will be assumed that the second face cc of the spectacle lens blank B must be shaped, in relation to the blocking face cx, so as to have a predetermined prism value, measured in prismatic diopters, with a predetermined orientation of the prism axis 56 with respect to, e.g., the horizontal axis 54. Moreover, it will be assumed that the spectacle lens has to be given a toric configuration with a cylinder axis 58 having a predetermined orientation with respect to, e.g., the horizontal axis 54, which orientation, as a rule, differs from the orientation of the prism axis 56. Now, in the conventional blocking approach, the cylinder axis 58 is normally aligned with the cut-outs 38 in the block piece 10. This obviously cannot be done with the present PBP block piece 10. It is clear that, if a defined amount of prism shall be generated in the spectacle lens, the spectacle lens blank B must be blocked with its prism axis 56 aligned with the prism direction in the PBP block piece 10. In the example of embodiment shown the prism in the workpiece mounting face portion 14 is oriented along the line XV-XV in FIG. 14, which in turn runs at right angles with respect to the cut-outs 38 in the basic body 12 (cf. FIG. 15). However, this could be different as long as there is a defined relation between the prism orientation of the workpiece mounting face portion 14 and the block piece mounting features on the back side of the block piece 10.

Figure 17:
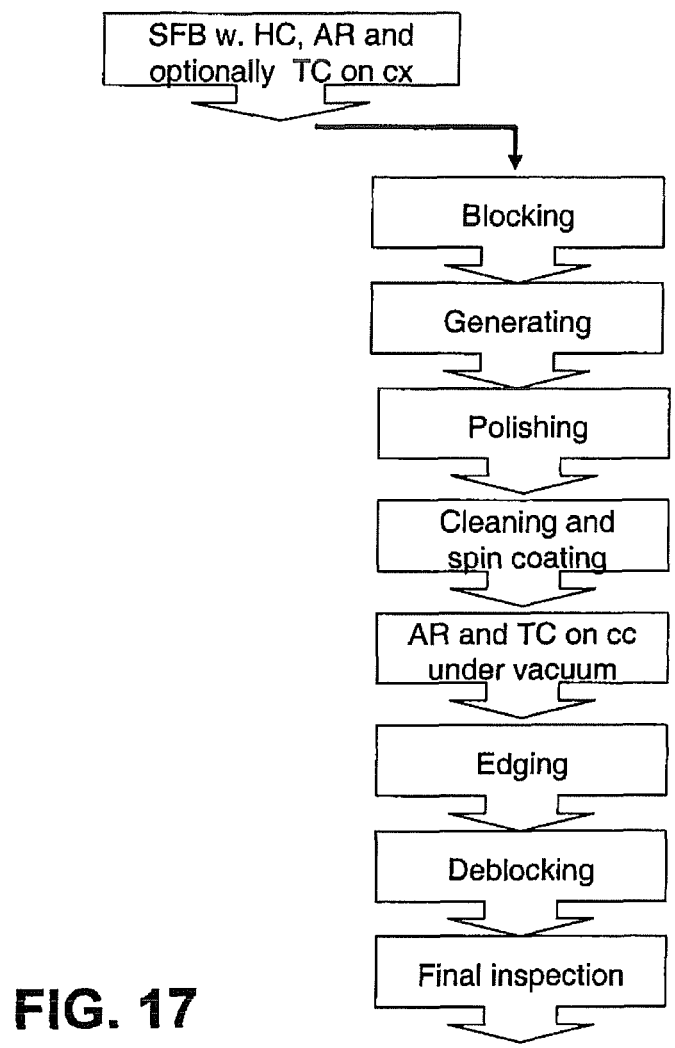
FIG. 17 is a flow chart illustrating among other things the main process steps of a method for manufacturing spectacle lenses according to a prescription in accordance with the present invention.

Finally, FIG. 17 shows by a flow chart the main process steps of a method for manufacturing spectacle lenses according to a prescription with the aid of a block piece 10 as described above.

Basically, this method comprises the steps of: (i) blocking a spectacle lens blank B with its blocking face cx on the workpiece mounting face portion 14 of the block piece 10 with the aid of a blocking material 16, (ii) processing the blocked spectacle lens blank B on the second face cc and optionally the edge E to obtain a processed spectacle lens, and (iii) deblocking the processed spectacle lens from the block piece 10, with the characterizing feature that the spectacle lens blank B remains on the proposed block piece 10 throughout the whole processing stage or step (ii). According to FIG. 17, the latter stage or step generally comprises the following substeps: "Generating", i.e. machining of the blocked spectacle lens blank B to give the second face cc a macrogeometry according to the prescription; "Polishing", i.e. fine machining of the blocked spectacle lens blank B to give the second face cc the required microgeometry; cleaning the blocked spectacle lens blank B that has been machined and fine machined; optionally spin, or dip coating of the blocked spectacle lens blank B in order to provide the second face cc with a hard coating HC (see FIG. 10), or a primer, or a primer and a hard coating; vacuum coating of the blocked spectacle lens blank B to provide an antireflection coating AR normally having four to seven layers made up of two to four materials with different refractive indices, as illustrated in FIG. 10 and optionally a top coating TC (cf. again FIG. 10) such as a hydrophobic and/or oleophobic and/or dust repelling coating on the second face cc; and optionally edging of the blocked spectacle lens blank B to give the edge E the required geometry so that the processed spectacle lens, after deblocking and final inspection, is ready for insertion into a spectacle frame or a spectacle holder. Since the single processing substeps and the equipment used in those are well known to the person skilled in the art further explanations in this respect are not required at this point.

As can further be seen from FIG. 17, for the reasons indicated in the introductory portion of the description already, it is preferred that the blocking face cx of the spectacle lens blank B is fully finished prior to the above blocking step (i), including hard coating HC, antireflection coating AR and optionally top coating TC such as super hydrophobic and/or oleophobic and/or dust repelling coating, i.e. the blocking face cx of the spectacle lens blank B would carry the multi-layer system as shown in FIG. 10 prior to blocking.

A block piece for holding in particular a spectacle lens blank and its use are proposed, which comprises a basic body having a workpiece mounting face portion against which the workpiece can be blocked with a blocking material, and a clamping portion via which the blocked workpiece can be fixed in a machine/apparatus for processing it. The basic body consists of a material having a defined low water absorption and/or is sealed to at least reduce outgassing of water moisture under vacuum conditions, so that the block piece is adapted to be used also in vacuum coating processes. Alternatively or in addition, the clamping portion is adapted to be clamped by forces directed essentially perpendicular to the radial direction to cancel out each other and not deform the basic body, and/or the workpiece mounting face portion is provided with a predetermined amount of prism.

Variations and modifications are possible without departing from the scope and spirit of the present invention as defined by the appended claims.

LIST OF REFERENCE NUMERALS 10 block piece
12 basic body
14 workpiece mounting face portion
16 blocking material
18 clamping portion
20 sealing coating
22 conical transition face
24 back face
26 radial outer annular portion
28 radial inner annular portion
30 clamping protrusion
32 side face
34 radial outer face
36 axial end portion
38 cut-out
40 blind hole
42 bottom
44 stiffening rib
46 inner circumference
48 radial inner face
50 recess
52 vertical axis
54 horizontal axis
56 prism axis
58 cylinder axis
A central axis
B spectacle lens blank
E edge of spectacle lens blank
F clamping force
cc second face of spectacle lens blank
cx blocking face of spectacle lens blank
AR antireflection coating
HC hard coating
TC top coating

The invention claimed is:

1. A block piece for holding a spectacle lens blank for processing thereof, comprising:

a basic body having a workpiece mounting face portion against which the spectacle lens blank can be blocked by a blocking material, and a clamping portion via which the spectacle lens blank blocked on said basic body can be fixed in a machine or apparatus for processing of the spectacle lens blank;

said basic body being substantially made from one of mineral glass or a plastic material that has a water absorption range of less than 1% at saturation, measured in accordance with DIN EN ISO 62:1999-08 standard, wherein the block piece is useable in thin film coating processes.

2. A block piece according to claim 1, characterized in that said basic body is substantially made from an essentially pure plastic material selected from a group comprising Polyethylene Terephthalate (PET) and Polycarbonate (PC).

3. A block piece according to claim 1, characterized in that said basic body is substantially made from a plastic material containing a filler to reduce water absorption within said basic body.

4. A block piece according to claim 1 further characterized in that said basic body is constructed for transmitting UV or visible light.

5. A block piece according to claim 1 further characterized in that said basic body is formed to be free of undercuts and narrow channels in which liquids could be trapped.

6. A block piece according to claim 1 further characterized in that said workpiece mounting face portion is free of cut-outs to provide full support of the blocked workpiece.

7. A block piece according to claim 1 further characterized in that said workpiece mounting face portion is essentially spherical in shape and tilted or shifted by a predetermined amount with respect to a central axis of said basic body in order to provide a defined amount of prism in the block piece.

8. A block piece according to claim 1 further characterized in that said clamping portion is constructed to be clamped by clamping forces that are directed essentially in opposite circumferential directions with respect to a central axis of said basic body or opposite tangential directions at a distance with respect to the central axis of said basic body.

9. A block piece according to claim 8 further characterized by said clamping portion of said basic body having at least one radially extending clamping protrusion that has two opposed side faces each facing in the circumferential direction, for application of said clamping forces.

10. A block piece according to claim 9 further characterized in that said clamping portion of said basic body has three radially extending clamping protrusions that are distributed circumferentially about the basic body.

11. A block piece according to claim 10 further characterized in that said clamping protrusions each have a radial outer face that is inclined with respect to the central axis of said basic body, wherein said radial outer faces together define an outer conical centering portion of said basic body.

12. A block piece according to claim 10 further characterized in that said clamping protrusions each have an axial end portion facing away from said workpiece mounting face portion, wherein said axial end portions each have a V-shaped cross-section seen in the radial direction.

13. A block piece according to claim 10 further characterized in that, on a side facing away from said workpiece mounting face portion, said basic body comprises two annular portions of different diameter that are concentrically arranged about the central axis of said basic body, the radial inner annular portion protruding beyond the radial outer annular portion in the axial direction, wherein said clamping protrusions extend between said annular portions.

14. A block piece according to claim 13 further characterized in that said radial inner annular portion of said basic body is provided with two cut-outs that are arranged on diametrically opposed sides with respect to the central axis of said basic body, for cylinder axis alignment of the block piece on a spindle of a machining machine.

15. A block piece according to claim 13 further characterized in that said radial inner annular portion of said basic body defines a central cylindrical blind hole having a flat bottom, wherein a plurality of stiffening ribs extends between said bottom and an inner circumference of said radial inner annular portion.

16. A block piece as defined in claim 1 further comprising:
said basic body is sealed by one of a group consisting of a coating and tape that serves to prevent or at least reduce outgassing of any water moisture trapped within the material of said basic body under vacuum conditions.

17. A block piece according to claim 16, characterized in that said basic body consists of an essentially pure Polymethyl Methacrylate (PMMA).

18. A block piece according to claim 16 further characterized in that said coating for sealing said basic body is selected from a group consisting of acrylates and epoxies.

19. A block piece according to claim 16 further characterized in that said basic body and one of said coating and tape for sealing said basic body being constructed for transmitting UV or visible light.

20. A block piece for holding an optical workpiece for processing thereof, comprising:
a basic body having a workpiece mounting face portion against which the workpiece can be blocked by a blocking material and a clamping portion via which the workpiece blocked on said basic body can be fixed in a machine or apparatus for processing of the workpiece; and
said basic body having said basic body exposed surfaces being sealed by one from a group consisting of a coating and tape that serves to prevent or at least reduce outgassing of any water moisture trapped within the material of said basic body under vacuum conditions, so that the block piece is useable in thin film coating processes.

21. A block piece according to claim 20, characterized in that said basic body that is sealed by one of said coating and tape consists of an essentially pure Polymethyl Methacrylate (PMMA).

22. A block piece according to claim 20 further characterized in that said coating for sealing said basic body is selected from a group comprising acrylates and epoxies.

23. A block piece according to claim 20 further characterized in that said basic body and one of said coating and tape for sealing said basic body being constructed for transmitting UV or visible light.

24. A block piece according to claim 20 further characterized in that said basic body is formed to be free of undercuts and narrow channels in which liquids could be trapped.

25. A block piece according to claim 20 further characterized in that said workpiece mounting face portion is free of cut-outs to provide full support of the blocked workpiece.

26. A block piece according to claim 20 wherein said basic body has a central axis characterized in that said workpiece mounting face portion is essentially spherical in shape and tilted or shifted by a predetermined amount with respect to a central axis of said basic body in order to provide a defined amount of prism in the block piece.

27. A block piece for holding a spectacle lens blank for processing thereof, comprising:
a basic body having a workpiece mounting face portion against which the spectacle lens blank can be blocked by a blocking material and a clamping portion via which the spectacle lens blank blocked on said basic body can be fixed in a machine or apparatus for processing of the spectacle lens blank;
said clamping portion being constructed to be clamped by clamping forces that are directed essentially in opposite circumferential directions with respect to a central axis of said basic body or opposite tangential directions at a distance with respect to the central axis of said basic body; and
said clamping portion of said basic body has at least one radially extending clamping protrusion that has two opposite side faces each facing in an opposite circumferential direction, for application of said clamping forces.

28. A block piece according to claim 27 further characterized in that said clamping portion of said basic body has three radially extending clamping protrusions that are distributed circumferentially about the basic body.

29. A block piece according to claim 28 further characterized in that said clamping protrusions each have a radial outer face that is inclined with respect to the central axis of said basic body, wherein said radial outer faces together define an outer conical centering portion of said basic body.

30. A block piece according to claim 28 further characterized in that said clamping protrusions each have an axial end portion facing away from said workpiece mounting face portion, wherein said axial end portions each have a V-shaped cross-section seen in the radial direction.

31. A block piece according to claim 28 further characterized in that, on a side facing away from said workpiece mounting face portion, said basic body comprises two annular portions of different diameter that are concentrically arranged about the central axis of said basic body, the radial inner annular portion protruding beyond the radial outer annular portion in the axial direction, wherein said clamping protrusions extend between said annular portions.

32. A block piece according to claim 31 further characterized in that said radial inner annular portion of said basic body is provided with two cut-outs that are arranged on diametrically opposed sides with respect to the central axis of said basic body, for cylinder axis alignment of the block piece on a spindle of a machining machine.

33. A block piece according to claim 31 further characterized in that said radial inner annular portion of said basic body defines a central cylindrical blind hole having a flat bottom, wherein a plurality of stiffening ribs extends between said bottom and an inner circumference of said radial inner annular portion.

34. A block piece for holding a spectacle lens blank for processing thereof, comprising:
a basic body having a workpiece mounting face portion against which the spectacle lens blank can be blocked by a blocking material,
a clamping portion via which the spectacle lens blank blocked on said basic body can be fixed in a machine or apparatus for processing of the spectacle lens blank, and
said workpiece mounting face portion being essentially spherical in shape and tilted or shifted by a predetermined amount with respect to a central axis of said basic body in order to provide a defined amount of prism in the block piece.

* * * * *